Dec. 6, 1938.  B. H. SCHWARZE  2,139,386
ELECTRICALLY OPERATED GAUGE
Filed Sept. 20, 1937
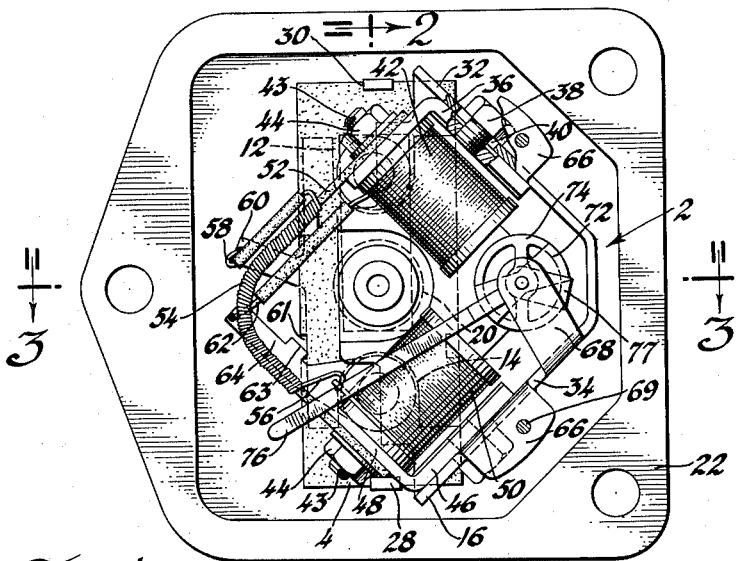
Fig. 1
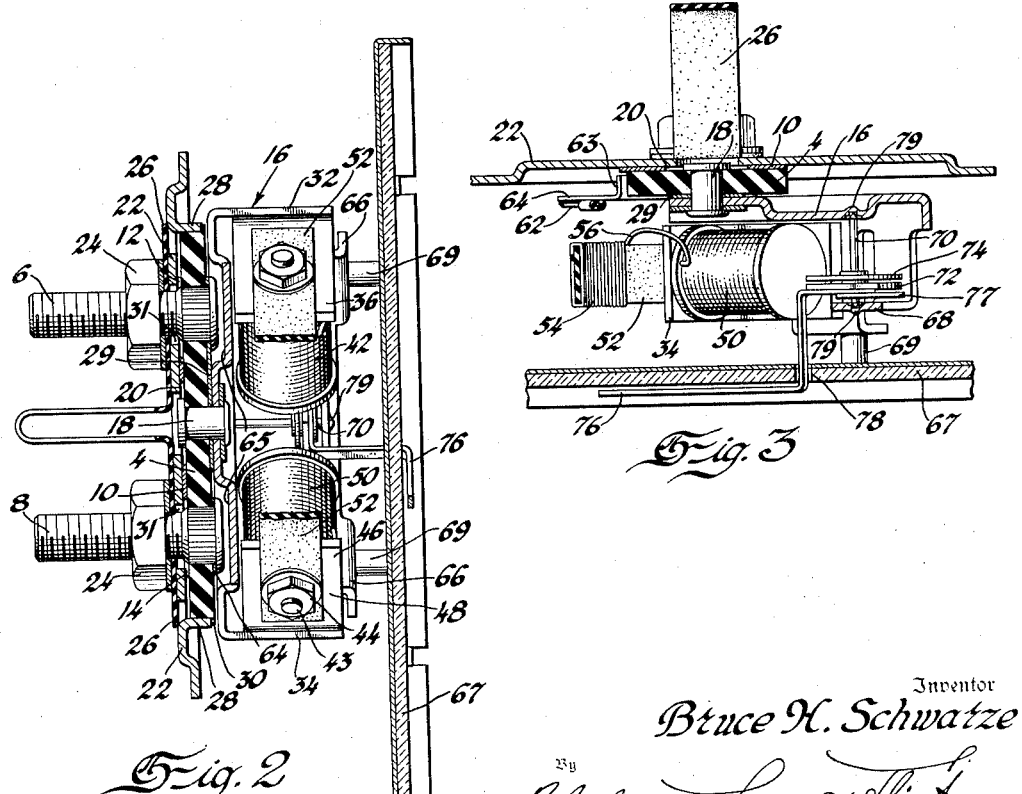
Fig. 2
Fig. 3
Inventor
Bruce H. Schwarze
By Blackmore, Spencer & Flint
Attorneys Patented Dec. 6, 1938

2,139,386

UNITED STATES PATENT OFFICE 2,139,386

ELECTRICALLY OPERATED GAUGE

Bruce H. Schwarze, Flint, Mich., assignor to General Motors Corporation, Detroit, Mich., a corporation of Delaware Application September 20, 1937, Serial No. 164,652

7 Claims. (Cl. 171—95)

This invention relates to gauges and particularly to a differential galvanometer used to record changes in electric current flowing in a circuit.

The gauge of the invention is an improvement on that shown in the application of Schwarze and Bigler, Ser. No. 122,190, filed January 25, 1937, and among other uses the gauge is adapted for recording changes in temperature of the water circulating system of an internal combustion engine.

The novelty of the invention relates to specific improvements in details of the gauge, such as the improved manner of mounting the resistance in series with one of the coils, and in the specific adjustable mounting of the two coils of the gauge.

On the drawing

Figure 1 is an elevational view of the gauge with the casing removed.

Figures 2 and 3 are sectional views along the corresponding lines of Figure 1.

Referring to the drawing, the numeral 2 indicates the gauge as a whole. The parts of the gauge in general are mounted on a base plate 4 made of insulating material and in the base plate there are mounted the terminal studs 6 and 8. On one side of the base plate 4 a metal conducting plate 10 is secured, the plate being provided with suitable enlarged openings 12 and 14 to surround the contact studs 6 and 8 and prevent electrical contact between parts 6, 8, and 10. On the other side of the base plate 4 and out of electrical contact with the plate 10 there is secured the frame 16 of the gauge, the frame and base 4 being secured together by means of the central rivet 18. The contact plate 10 is also provided with an enlarged opening 20 to surround the rivet 18 and keep parts 18 and 20 out of electrical contact with each other. A back plate 22 is removably held against the plate 10 by means of the nuts 24 threaded onto the studs 6 and 8. An insulating strip 26 is positioned between the nuts 24 and the contact plate 10 so that there is no electrical contact between the nuts 24 and the plate 10. The back plate 22 has tongues 28 bent therefrom, the tongues fitting into recesses 30 at the sides of the base plate 4 and serving to position the base 4 and plate 22 relative to each other. The back plate 22 has enlarged openings 31 surrounding the studs 6 and 8 to prevent direct electrical contact.

The contact stud 6 has a jumper strip 29 connected thereto and to the rivet 18 and serves as an electric contact between the stud 6 and the frame 16.

The frame 16 has the upwardly bent side walls 32 and 34. To the side wall 32 there is adjustably mounted the soft iron angle member 36. The adjustability is accomplished by means of the machine screw 38 threaded into the angle iron, the shank of the screw operating in a slot 40 in the frame wall. The wing of the angle iron not secured to the frame extends inwardly thereof and there is rigidly mounted thereon the coil 42. This coil preferably has a resistance of eight ohms and is secured in place by means of the screw threaded shank 43 and the nut 44. The soft iron angle 36 is used to localize the flux and boost the strength of the field.

To the other wall 34 there is adjustably secured a brass angle member 46 which is mounted in the same way as the angle iron 36. To the free wing 48 of the brass angle member 46 there is secured the coil 50 (preferably of copper wire) secured to the wing 48 by the stud 43 and nut 44 in the same manner as the coil 42 is secured to the angle iron 36. By the mounting of the angles 36 and 46 in the manner described an easy adjustability of both coils is obtained. This adjustability of the coils makes an easy scale adjustment or selection. With this mounting it is possible to obtain almost any desired type of scale and the gauge may be used either in upright or inverted position.

Secured to the angles 36 and 46 by means of the nuts 44 there is an insulating piece or strip 52 (preferably bakelite) which extends from one nut 44 to the other nut 44. This strip is more or less bowed in its middle as shown and has wound therearound the resistance wire 54 (preferably copel wire, composition nickel 45%, copper 55%) which has a resistance of 35 ohms. One end 56 of the resistance wire 54 is connected in series with the coil 50 (preferably of copper wire) which has a resistance of 27 ohms while the other end 58 of the resistance is connected to an arm 60 integral with the plate 10. The resistances of the coil 50 and the resistance 54 give a relatively low internal heating in the coil.

The end 62 of the wire of the coil 42 is connected to the end of an arm 64, the other end of which is secured to the contact stud 8. A notch 61 in the base 4 and a finger 63 on the arm 64 position the arm 64.

The frame 32 as is best shown in Figure 2 has inwardly pressed depressions 65 over the heads of the studs 6 and 8 so that the frame is out of electrical contact therewith. The frame is also provided with ears 66 to which the dial 67 is secured by means of the posts 69.

A third ear 68 is bent inwardly of the frame and between the end of the ear 68 and the frame the pointer shaft 70 is mounted. The pointer shaft has secured thereto the armature 72 (made of magnet steel and magnetized), vibration damper 74, the pointer 76, and the pointer balance weight 77. The pointer 76 is suitably bent as shown in Figure 3 and projects through an opening 78 in the dial and is adapted to move thereover in response to the movement of the permanent magnet 72 which is actuated by the strength of the fields of the coils 42 and 50. The ear 68 and the frame are provided with suitable depressions 78 to mount the pointed ends of the shaft 70.

By referring to Figure 1, it will be noted that the coils 42 and 50 are arranged in fan shape and that the pointer shaft 70 is pivoted at substantially the intersection of the extended center lines of the two coils.

The path of the electric current through the instrument is as follows: the current will enter at the contact stud 6 and pass through the jumper strip 28 into the frame 32 to which one end of each of the coils 42 and 50 is united. In the frame the current will divide between the two coils, the current which passes through the coil 42 leaving the coil at the terminal 62 and passing through the finger 64 to the stud 8, and from the stud 8 through a suitable variable resistance to cause a variation of the current passing through the coil and thereby vary the field about the coil. See the patent to Bacon, 1,791,786. From the variable resistance the current returns to the battery. The current which passes through the coil 50 will pass through the resistance 54 and to the finger 60 integral with the plate 10. From the plate 10 the current will pass to the back plate 22 and then to ground. The position of the pointer 76 will, of course, depend upon the strength of the fields of the two coils and by placing a variable resistance in series with the coil 50 and the resistance 54, the field is caused to be varied thereby to affect the permanent magnet 72 and to cause a movement of the pointer. By graduating the scale over which the pointer moves in degrees of temperature corresponding to different amounts of current passing through the coils the instrument can be read directly in temperatures.

I claim:

1. In a gauge for measuring changes in electrical current flowing from a source, a frame, two coils arranged in fan shape, a pointer movably mounted in the frame substantially at the intersection of the axes of the coils, means adjustably to secure the coils to the frame, a piece of insulating material secured to said means, a resistance mounted on said piece and connected in series with one of the coils, and means to conduct the current from the source through the coils.

2. In a gauge for measuring changes in electrical current flowing from a source, a frame, two coils arranged in fan shape, a pointer movably mounted on the frame at substantially the point of intersection at the axes of the coils, a brass bracket adjustably secured to the frame adjustably to mount one of the coils to the frame, an iron bracket adjustably secured to the frame adjustably to mount the second coil and to localize its field, a piece of insulating material secured to the frame, a resistance mounted on said insulating piece and connected in series with one only of the coils, and means to conduct the current from the source through the coils.

3. In a gauge for measuring changes in electrical current flowing from a source, a frame, two coils arranged in fan shape, a pointer pivotally mounted at substantialy the point of intersection of the axes of the coils, a brass angle member adjustably mounted on the frame and having one of the coils secured thereto, an iron angle member adjustably secured to the frame and having the other coil secured thereto, a piece of insulating material secured to the angle members, a resistance mounted on said piece of insulating material and connected in series with the coil mounted on the brass angle, and means to conduct the current from the source through the coils.

4. In a gauge for measuring changes in electrical current flowing from a source, a frame, two coils arranged in fan shape, said coils having resistances of 27 ohms and 8 ohms respectively, a pointer pivotally mounted at substantially the point of intersection of the axes of the coils, a brass angle member adjustably mounted on the frame and having the 27-ohm coils secured thereto, an iron angle member adjustably secured to the frame and having the other coil secured thereto, a piece of insulating material secured to the angle members, a resistance mounted on said piece of insulating material and connected in series with the coil mounted on the brass angle, and means to conduct the current from the source through the coils.

5. In a gauge for measuring changes in electrical current flowing from a source, a frame, two coils arranged in fan shape, a pointer pivotally mounted at substantially the point of intersection of the axes of the coils, a brass angle member adjustably mounted on the frame and having one of the coils secured thereto, said coil having a resistance of 27 ohms, an iron angle member adjustably secured to the frame and having the other coil secured thereto, said other coil having a resistance of 8 ohms, a piece of insulating material secured to the angle members, a resistance of 35 ohms mounted on said piece of insulating material and connected in series with the coil mounted on the brass angle, and means to conduct the current from the source through the coils.

6. In a gauge for measuring changes in electric current flowing from a source, a frame, a brass angle member and an iron angle member secured to the frame, two coils, one coil for each angle member, a pointer pivotally mounted at substantially the point of intersection of the axes of the coils, a piece of insulating material secured to the angle members, common means to secure the piece of insulating material and coils to the angle members, a resistance wound on the piece of insulation and connected in series with the coil secured to the brass angle member, two terminals insulated from direct contact with the frame, a lead for the incoming current from one terminal to the frame, and leads from the second coil and from the resistance to the other terminal and to ground, respectively.

7. In a gauge for measuring changes in electric current flowing from a source, a frame, a strip of insulation secured to the frame, two terminals secured to the insulation, means electrically to connect one only of the terminals to the frame, an electrical conductor out of contact with the terminals and secured to the side of the strip opposite the frame, two metal angle members adjustably secured to the frame, two coils, one coil secured to each angle member, a pointer turnably mounted substantially at the intersection of the axes of the coils, a piece of insulation mounted on the angle members, a resistance mounted on said piece of insulation, said resistance being connected in series with one only of the coils, means to connect the resistance to the said electrical conductor, means to connect the electrical conductor to ground, and means to connect the second coil to the terminal insulated from the frame.

BRUCE H. SCHWARZE.